US006058876A

United States Patent [19]

Keene

[11] Patent Number: 6,058,876

[45] **Date of Patent: *May 9, 2000**

[54] BLOOD TYPE-SPECIFIC SAFETY LABELING SYSTEM FOR PATIENTS AND BLOOD PRODUCTS

[76] Inventor: Douglas Keene, 7 Westerly Rd., Weston, Mass. 02193

[ * ] Notice: This patent issued on a continued prosecution application filed under 37 CFR 1.53(d), and is subject to the twenty year patent term provisions of 35 U.S.C. 154(a)(2).

[21] Appl. No.: 09/156,024

[22] Filed: Sep. 17, 1998

[51] Int. Cl.[7] ................................ G09F 3/00; G01D 7/00

[52] U.S. Cl. ............................ 116/200; 116/1; 40/299.01

[58] Field of Search .................................... 116/200, 201, 116/1, DIG. 1; 40/299.01, 633

[56] References Cited

U.S. PATENT DOCUMENTS

| | | | |
|---|---|---|---|
| 3,403,380 | 9/1968 | Welch | 235/300 |
| 3,656,473 | 4/1972 | Sodickson et al. | 600/584 |
| 3,739,341 | 6/1973 | Tessler | 340/825.34 |
| 3,814,049 | 6/1974 | Hunter | 116/200 |
| 3,848,112 | 11/1974 | Weichselbaum et al. | 235/375 |
| 4,122,947 | 10/1978 | Falla | 206/569 |
| 4,857,716 | 8/1989 | Gombrich et al. | 235/375 |
| 4,919,635 | 4/1990 | Bertrand | 446/128 |
| 5,069,647 | 12/1991 | Zuviria | 446/127 |
| 5,758,443 | 6/1998 | Pedrazzini | 40/633 |

*Primary Examiner*—Andrew H. Hirshfeld
*Assistant Examiner*—R A Smith
*Attorney, Agent, or Firm*—Samuels, Gauthier & Stevens

[57] ABSTRACT

A labeling system to ensure that blood products are compatible with a patient's blood type. A blood product housing, which is attached to a blood product, comprises a plurality of block-like projections and recesses corresponding to the antigens/antibody characteristics of a blood product. A patient housing, secured to the patient, comprises a plurality of mirror image three-dimensional block-like projections and recesses corresponding to the antigen/antibody characteristics of the patient's blood. If the blocks and recesses of the housings mate and seat to one another this confirms the blood product is compatible with the blood of the patient. If the blocks and recesses of the housings do not mate and seat to one another this confirms the blood product is not compatible with the blood of the patient.

8 Claims, 8 Drawing Sheets

A Red Blood Cell (RBC)
Type A Positive

Plasma
Type A Positive

BLOOD TYPE-SPECIFIC SAFETY LABELING SYSTEM FOR PATIENTS AND BLOOD PRODUCTS

BACKGROUND OF THE INVENTION

1. Field of the Invention

A key type identification system for blood products.

2. Description of the Relevant Art

Human blood is "Typed," or classified into groups, to determine its compatibility with blood or blood products from another individual. If incompatible blood or blood products are administered (as with a blood transfusion), the automatic blood cell- and tissue-destroying process which ensues can be disastrous, and potentially fatal to the recipient.

The current blood typing system is extremely sophisticated and complex, to the point that it can be difficult even for experienced health care professionals to comprehend or remember. Therefore, health care institutions engaged in the practice of transfusion medicine almost always utilize "Blood Banks," or departments devoted exclusively to the maintenance, processing, typing, distribution, and documentation of all aspects of transfusion therapy.

While the compartmentalization of the blood bank is essential for safety and quality assurance, it often hides the technical aspects of transfusion therapy from health care personnel who are not directly involved with the Blood Bank. Although errors inevitably occur in blood processing, they are usually Identified and corrected before the blood is administered. Nonetheless, the health care profession must continue to seek better safeguards and methods of avoiding the potentially fatal administration of incompatible blood products to a patient.

The current ABO typing system is complex and errors can occur anywhere in the processing of blood or blood products.

There are two parts or components of human blood on which blood typing is based: the Red Blood Cells (RBC's), and the Plasma. Red blood cells primarily carry oxygen to the tissues, and Plasma is the liquid medium through which they travel throughout the body.

On the surface of each RBC are "Antigens," or proteins, which can react with "Antibodies," found in the plasma. These Antigen-Antibody reactions usually result in the destruction of the RBC's, and this process is an extension of one of the body's natural methods of self defense. Blood "Typing" is a process which identifies the common or major Antigens and Antibodies found in blood. The three antigens are named "A," "B," and "RH"; the antibodies and are named for the antigens with which they combine: "Anti-A", "Anti-B", and "Anti-RH." Antigens are found on RBC's, and Antibodies are found in Plasma.

TABLE A

| MAJOR ANTIGENS ON RBC'S | MAJOR ANTIBODIES IN PLASMA |
|---|---|
| A | Anti-A |
| B | Anti-B |
| Neither A nor B | — |
| RH | Anti-RH |

When an antigen is combined with its corresponding Antibody, i.e., A with Anti-A, B with Anti-B, or RH with Anti-RH, a series of chemical reactions occur which ultimately destroy the RBC, and may trigger other tissue damaging processes. Humans have developed such that the genetically determined presence or absence of Antigens A, B, and RH determines the corresponding presence or absence of Anti-A, Anti-B, and Anti-RH.

In normal individuals, if A is found on the surface of the RBC, the plasma does not contain Anti-A; if A is not present on the surface of the RBC, the plasma does contain Anti-A. The same applies for B and RH. If both A and B are found on the surface, then neither Anti-A nor Anti-B are present in the plasma. If neither A nor B are present on the surface of the RBC, then both Anti-A and Anti-B are found in the plasma. The following Table B summarizes.

TABLE B

| ANTIGEN PRESENCE ON RBC | RH ANTIGEN PRESENCE ON RBC | BLOOD TYPE | ANTIBODIES PRESENT IN PLASMA |
|---|---|---|---|
| A Only | Not Present | A Negative | Anti-B, Anti-RH |
| A Only | Present | A Positive | Anti-B |
| B Only | Not Present | B Negative | Anti-A, Anti-RH |
| B Only | Present | B Positive | Anti-A |
| A and B | Not Present | AB Negative | Anti-RH |
| A and B | Present | AB Positive | None |
| Neither | Not Present | O Negative | Anti-A, Anti-B, Anti-RH |
| Neither | Present | O Positive | Anti-A, Anti-B |

There are, by definition, combinations of blood types which will unite the antigen with its corresponding antibody, triggering the destruction of the RBC. For example, whole blood of type A positive (with RBC surface antigens A and RH, and plasma antibody Anti-B) when mixed with whole blood of type B positive (with RBC surface antigens B and RH and plasma antibody Anti-A) will bring together the RBC- destroying combinations of surface antigen A with plasma antibody Anti-A and surface antigen B with plasma antibody Anti-B. Thus, these types are considered "incompatible."

A patient can only receive whole blood of the exact same type. This is called "type specificity." Because this limits the quantity of blood that is available to any given patient for transfusion therapy, whole blood collected from blood donors is usually fractionated or separated into its components to yield plasma, platelets and packed RBC's.

The ABO typing system is also used to classify these individually separated blood components (i.e., Fresh Frozen Plasma, Platelets, and Packed RBC's). The same compatibility rules apply, but the presence or absence of RBC's (and their surface antigens) or plasma (and its antibodies) in the blood component determines its compatibility with a patient's whole-blood. Packed RBC's typically do not contain Plasma; therefore, the absence of plasma antibodies increases the number of combinations of blood types with which the Packed RBC's are compatible.

A patient having blood type A positive, for example, while able to receive only whole blood of type A positive, could also receive Packed RBC's of types A positive, A negative, O positive and O negative; and Plasma of types A positive and AB positive. Similarly, a patient of blood type B negative, while able to receive only whole blood of type B negative, could also receive Packed RBC's of types B negative and O negative; and Plasma of types B negative, B positive, AB negative and AB positive. The following table summarizes whole blood types and their compatibility with individual blood components.

TABLE C

| | A NEG | A POS | B NEG | B POS | AB NEG | AB POS | O NEG | O POS |
|---|---|---|---|---|---|---|---|---|
| Compatibility Between Whole Blood Type (Vertical) and Packed RBC Type (Horizontal) | | | | | | | | |
| A NEG | X | | | | | | X | |
| A POS | X | X | | | | | X | X |
| B NEG | | | X | | | | X | |
| B POS | | | X | X | | | X | X |
| AB NEG | X | | X | | X | | X | |
| AB POS | X | X | X | X | X | X | X | X |
| O NEG | | | | | | | X | |
| O POS | | | | | | | X | X |
| Compatibility Between Whole Blood Type (Vertical) and Plasma Type (Horizontal) | | | | | | | | |
| A NEG | X | X | | | X | X | | |
| A POS | | X | | | | X | | |
| B NEG | | | X | X | X | X | | |
| B POS | | | | X | | X | | |
| AB NEG | | | | | X | X | | |
| AB POS | | | | | | X | | X |
| O NEG | X | X | X | X | X | X | X | X |
| O POS | | X | | X | | X | | X |

X indicates "Compatible"

It is the shared responsibility of the blood bank and the individual health care practitioners to know and remember which blood mixture combinations are compatible, and to recognize and remember those combinations which are incompatible (and potentially lethal).

With any process, errors occur unavoidably. There are many areas in transfusion medicine into which human error can be introduced. Although regulations require that quality control measures and error identification and analysis programs be ongoing in health care facilities, the complete elimination of errors in collection, typing, labeling, distribution, administration, and documentation, can never be achieved. All attempts, therefore, must be focused on the minimization of certain types of easily avoidable errors.

While many safeguards are in place for the prevention of this potential catastrophe, there are still situations in which Inadvertent administrations occur. For example, a unit of blood may have been sent to a different patient with the same name; the blood administrator may have confused one patient's blood product for that of another patient. A wrong unit of blood may have been given under the stress of managing the patient's life-threatening emergency, or during the late-night shift, or at any time when the administrator's vigilance may be compromised.

Most patient-type and blood-product-type identification systems focus on the administrator's verification of the accuracy of labeled information to assure type compatibility. Some inventions have attempted to invoke technology such as portable computers and bar-code readers to identify potential errors of type compatibility. Expensive computer technology is often unavailable, and humans process information with a fixed degree of fallibility, such that information is misprocessed by humans at a rate which is directly proportional to levels of stress.

Most patient-type and blood-product-type identification systems are human-driven; therefore, this invention is designed to simplify the recognition of type-compatibility and type-incompatibility to reduce the potential for the inadvertent administration of incompatible blood-products.

SUMMARY OF THE INVENTION

The invention embodies three dimensional complimentary and uncomplementary shapes to predict the theoretical compatibility and incompatibility of typed blood product combinations.

When a patient enters a health care setting in which blood transfusion therapy is possible, his/her blood type is determined. Next, a wrist identification band is applied with demographic information to which a labeled plastic tag is attached in the shape which corresponds to his/her whole-blood type according to the previously described model.

Once the need is determined for the administration of blood products, the blood bank affixes to the blood product packaging a labeled plastic tag which is in the shape of the blood type of the specific blood product according to the previously described model.

Once the blood product package is brought to the patient, and after existing protocols for proper identification of the patient and the corresponding blood product package, the two labeled plastic tags are compared. As previously described, complimentary shapes predict appropriately matched blood types, while uncomplimentary shapes warrant further verification.

The system is designed to be a simple, cost effective means of identifying Blood Type incompatibilities, and in confirming Blood Types compatibilities in blood transfusion therapy. Successful implementation of this model should improve patient safety in the health care setting.

Broadly the invention comprises a labeling system to ensure that blood products are compatible with a patient's blood type. A blood product housing comprises a plurality of three-dimensional physical indicia corresponding to the antigen/antibody characteristics of a blood product. A patient housing comprises a plurality of mirror image three-dimensional physical indicia corresponding to the antigen/antibody characteristics of a blood product. The blood product housing is engaged to the patient housing. If the indicia mate and seat to one another this confirms that the blood product is compatible with that of the patient. If the indicia do not mate and seat to one another this confirms that the blood product is not compatible with that of the patient.

In a preferred embodiment, the indicia are block-like recesses and blocks which are arrayed to correspond to blood types.

DESCRIPTION OF THE PREFERRED EMBODIMENT(S)

The labeling system of the invention, while based on the state-of-the-art ABO Typing System, simplifies the complex aspects of the ABO Typing System and uses a labeling system physically shaped to distinguish combinations of blood-products which are compatible from those combinations which are incompatible.

The labeling system, while complimenting a health care professional's knowledge, does not rely on that knowledge, which may, for any reason, be compromised.

In the following discussion, the presence of an antigen on a RBC or of an antibody on the plasma is indicated schematically by the block in its appropriate recess. Its absence is indicated by an empty recess.

Figure 1:
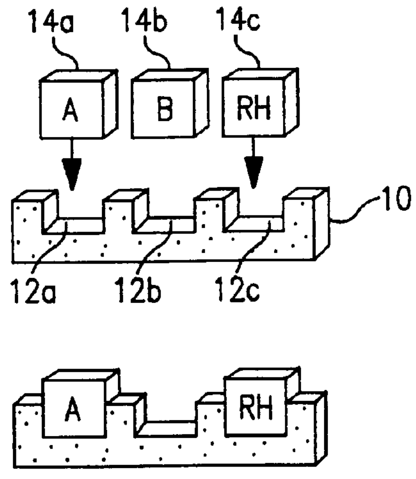
FIG. 1 is a perspective view of a portion of a labeling system embodying the invention for the antigen relationship of a red blood cell of type A positive.

Referring to FIG. 1, a RBC is represented schematically as a dark block-like housing 10 with three recesses 12*a,* 12*b* and 12*c* for three major block-like antigens A, B and RH, 14*a,* 14*b* and 14*c* respectively, of type A positive. The leftmost recess 12*a* placeholder is always reserved for antigen 14*a,* the middle recess 12*b* for antigen 14*b,* and the rightmost recess 12*c* for antigen 14*c.*

Figure 2:
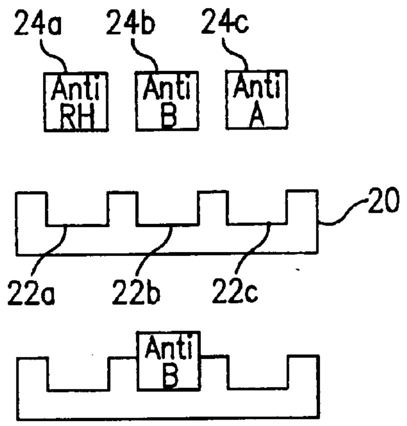
FIG. 2 is an illustration of a system for plasma of type A positive.

Referring to FIG. 2, the plasma is similarly represented as a light block-like housing 20 with three recesses 22*a,* 22*b* and 22*c* for three major block-like antibodies 24*a,* 24*b* and 24*c,* Anti Rh, Anti B and Anti A respectively.

An RBC of each of the major blood types can thus be represented. Referring to Table D below, for simplification, the housings representing the antigens are now dark.

TABLE D

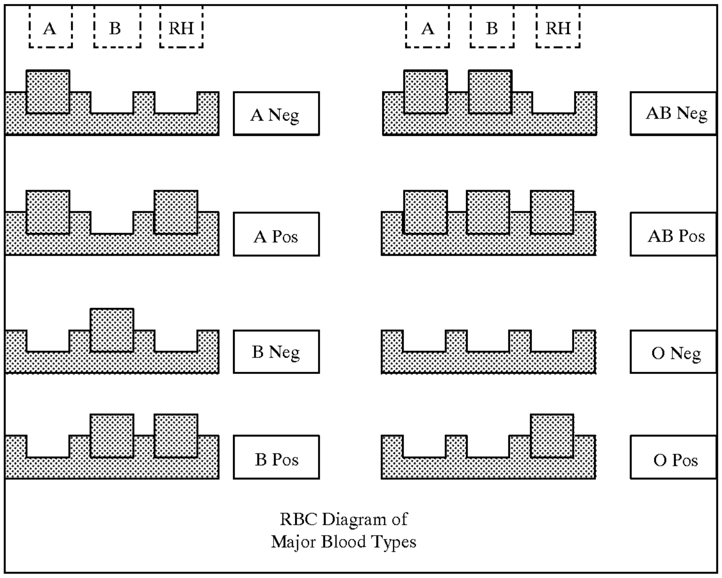

Normal plasma and RBC's coexist with the appropriate combination of antigens and antibodies according to the aforementioned table. Using a similar model for the plasma object, and remembering that the placeholders for the antibodies mirror those for the antigens, then corresponding plasma for RBC's of a specific Type can be represented in Table E below.

TABLE E

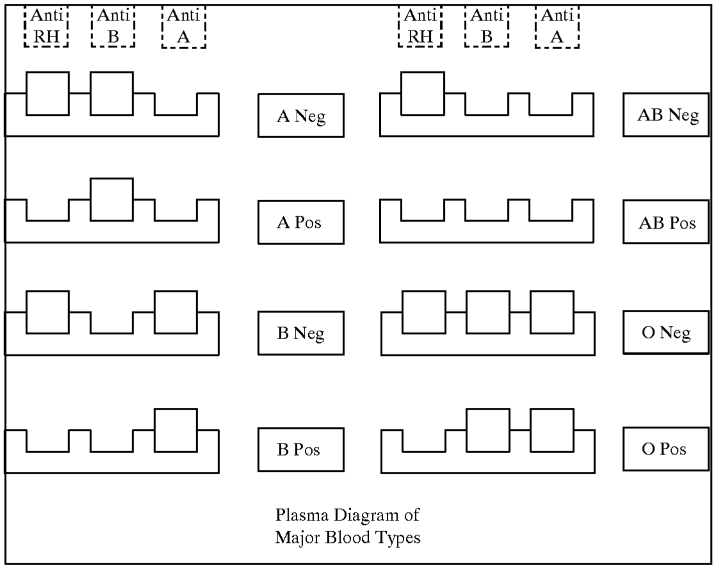

Plasma Diagram of Major Blood Types

Figure 3:
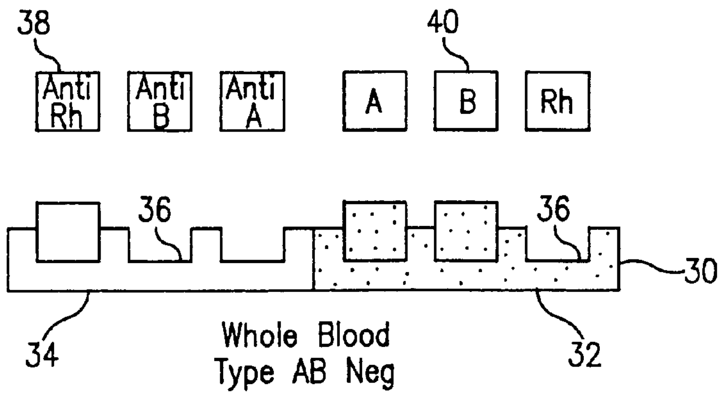
FIG. 3 is an illustration of a system for whole blood of type AB negative.

FIG. 3 is an example of AB Negative whole-blood. Because normal human plasma coexists with RBC's, the labeling system can represent any whole-blood (a combination of plasma and RBC's) with the plasma object on the left (light) and its corresponding RBC object on the right (dark). A housing 30 is both dark 32 (RBCs) and light 34 (plasma) and both are characterized by recesses 36. Both antibodies 38 and antigens 40 are shown.

With whole-blood as an example, the labeling system can represent all major blood Types using appropriate combinations of plasma objects and RBC's are shown in Table F below.

TABLE F

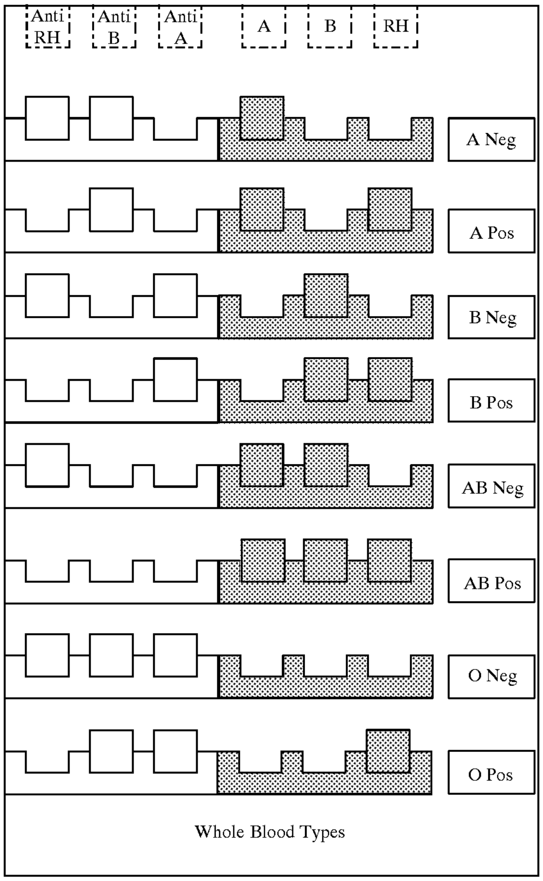

Whole Blood Types

Figure 4:
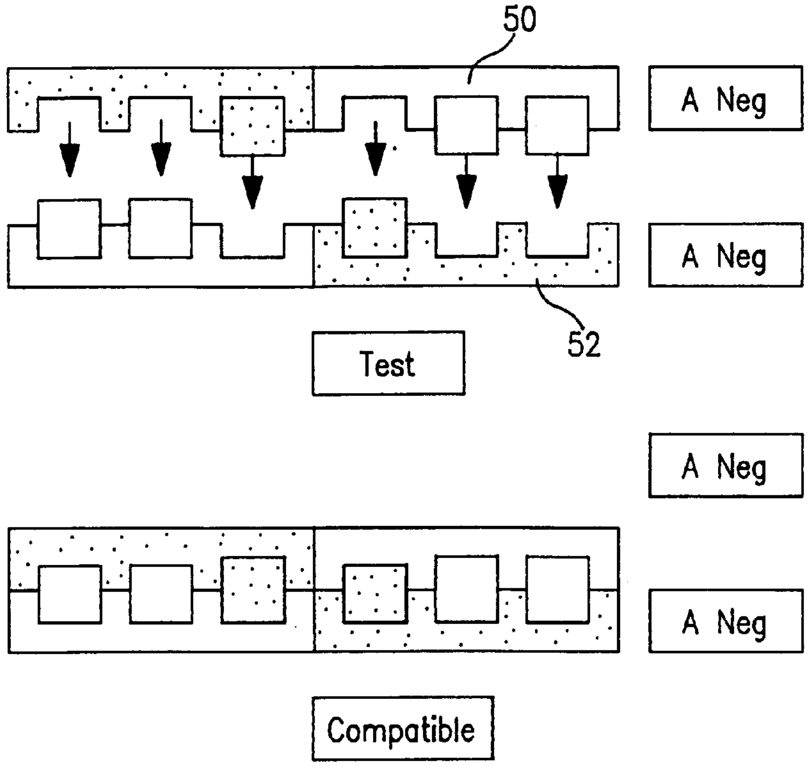
FIG. 4 is an illustration of a system of a compatible type A negative.

The labeling system of the invention differentiates between the compatibilities and incompatibilities of different blood type combinations. To test for compatibility using the previously described structures, (for example whole-blood), the structures are three dimensional objects (although shown in front views), similar to "locks and keys." Referring to FIG. 4, a blood product housing 50, secured to a blood product (not shown) for A Neg is placed over a patient housing 52, such as attached to a patient's wrist band (not shown). The dark RBC structures approach the light plasma objects. The recesses for the antigens and the antibodies are deliberately complimentary, such that they can fit together.

Each blood type is normally compatible with itself, as demonstrated by this example.

The labeling system can also be used for blood components. For example, the component "Packed RBC's" describes a whole-blood byproduct from which plasma has been effectively removed, leaving only RBC's. As such, normally, the antibodies contained in the plasma are no longer present.

Figure 5:
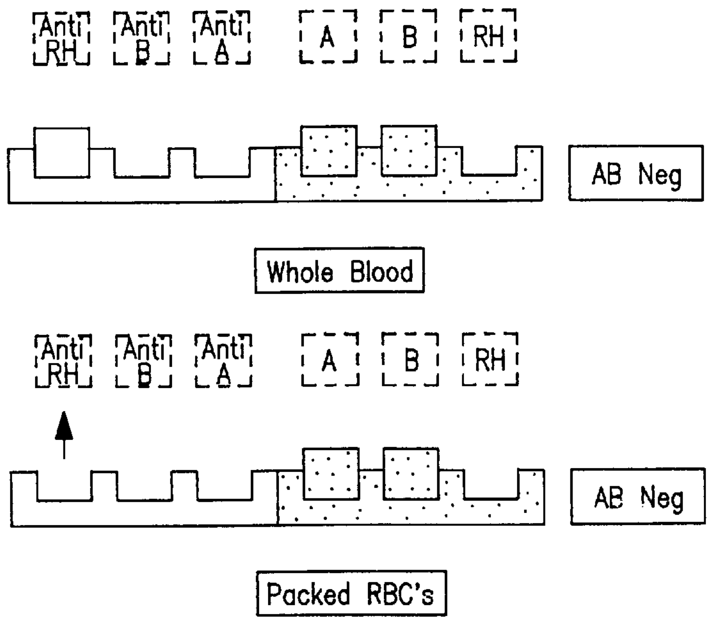
FIG. 5 is an illustration of whole blood of type AB negative and corresponding packed RBC's of type AB negative (plasma and plasma antigens removed)

Referring to FIG. 5, whole-blood of Type AB Negative and a corresponding product of Packed RBC's of Type AB Negative are shown.

Figure 6:
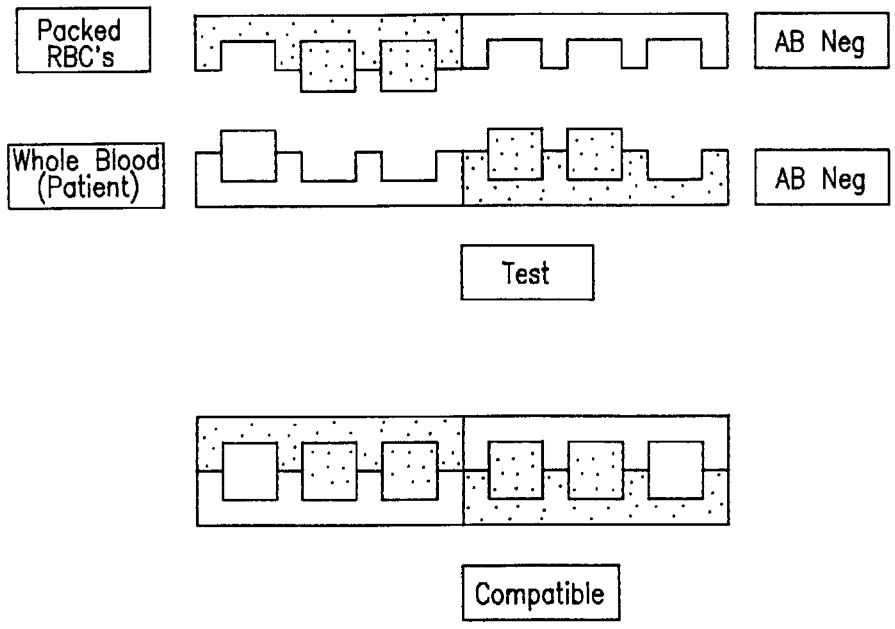
FIG. 6 is an illustration of a match of patient (whole blood) of type AB negative which is compatible with packed RBC's of type AB negative.

As shown in FIG. 6, the labeling system ensures that a patient of Type AB Negative (assumed to have whole-blood) could receive Packed RBC's of his/her own type.

Figure 7:
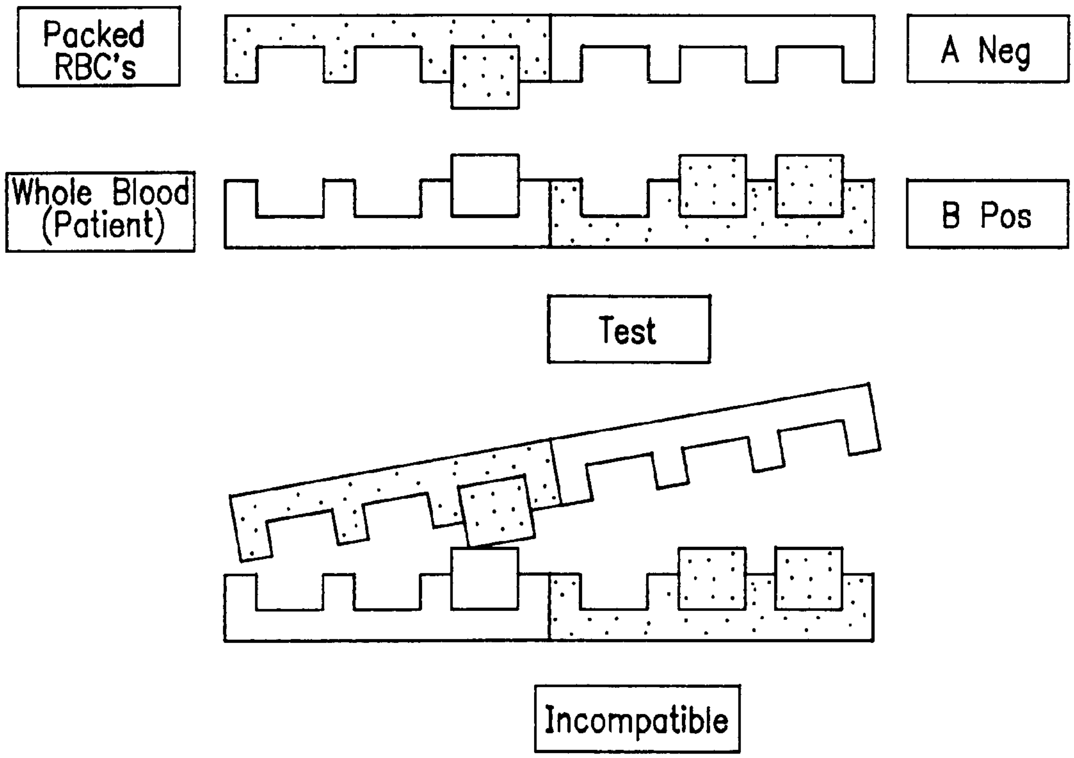
FIG. 7 is an illustration of a model which predicts compatibility such that a patient with type B positive blood should not normally receive packed RBC's of type A negative.

As shown in FIG. 7, the labeling system also ensures that a patient with blood Type B Positive should not normally receive Packed RBC's of Type A Negative.

Figure 8:
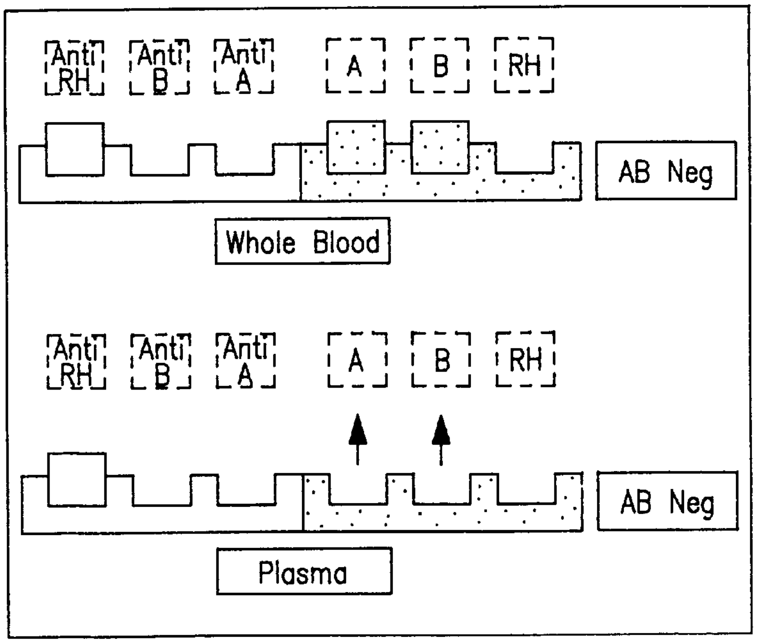
FIG. 8 is an illustration of whole blood of type AB negative and a corresponding plasma of type AB negative RBC's and RBC antigens removed.

The labeling system can also be used to represent another blood components, such as Fresh Frozen Plasma (FFP). This component describes a whole-blood byproduct from which the RBC's have been effectively removed. As such, normally, the antigens contained on the surface of the RBC's are no longer present. In FIG. 8, whole-blood of Type AB Negative, and a corresponding product of FFP of Type AB Negative are shown.

Figure 9:
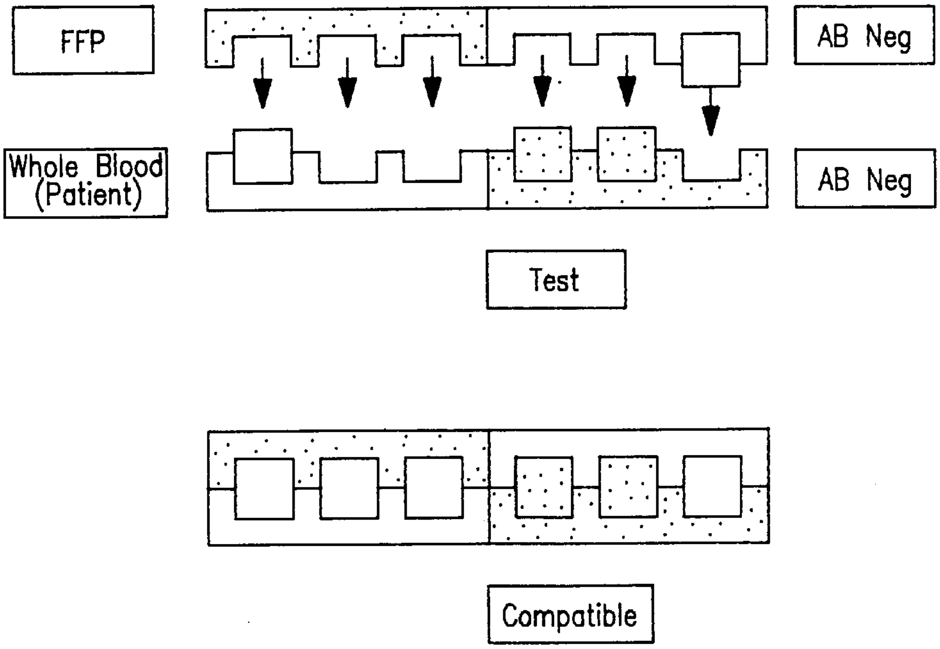
FIG. 9 is an illustration of a model which predicts compatibility such that a patient with type AB negative blood can normally receive fresh frozen plasma of type AB negative.

As shown in FIG. 9, the labeling system ensures that a patient of Type AB Negative (patients are normally assumed to have whole-blood) could receive FFP of his/her own type.

Figure 10:
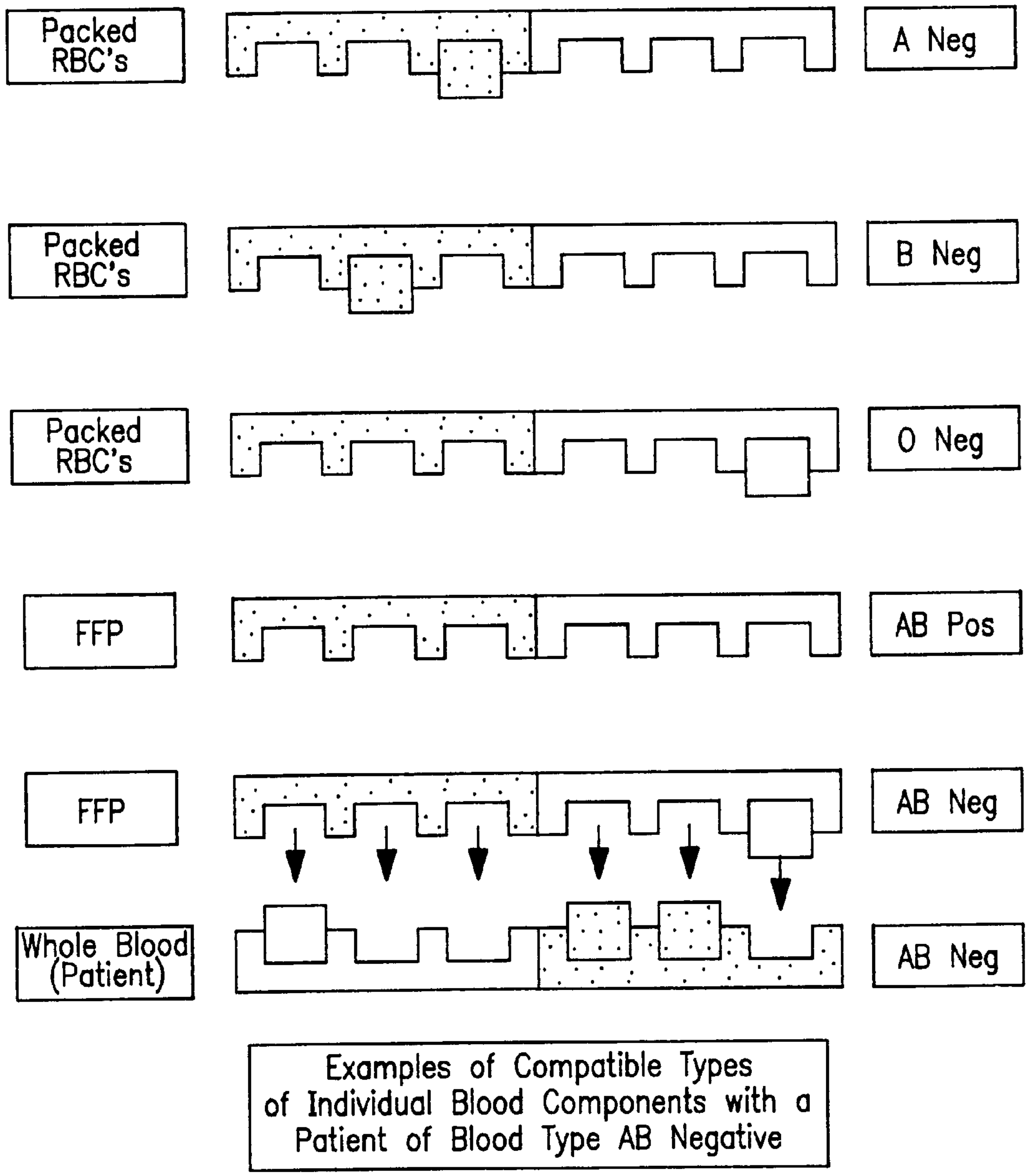
FIG. 10 illustrates the labeling system's ability to confirm the compatibility of individual blood components of differing types with a patient's blood of type AB negative.
Figure 11:
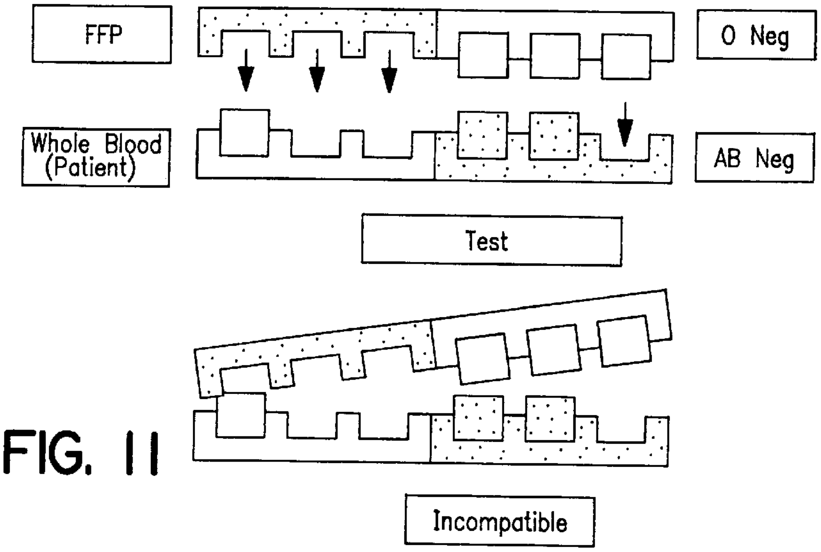
FIG. 11 is an illustration of a model which predicts compatibility such that a patient with type AB negative blood should not normally receive fresh frozen plasma of type O negative.

As shown in FIG. 10, the labeling system has the ability to confirm the compatibility of individual blood components of differing types with a patient's blood of type AB negative;

As shown in FIG. 11, the labeling system also ensures that a patient with blood Type AB Negative should not normally receive FFP of Type O Negative.

Figure 12:
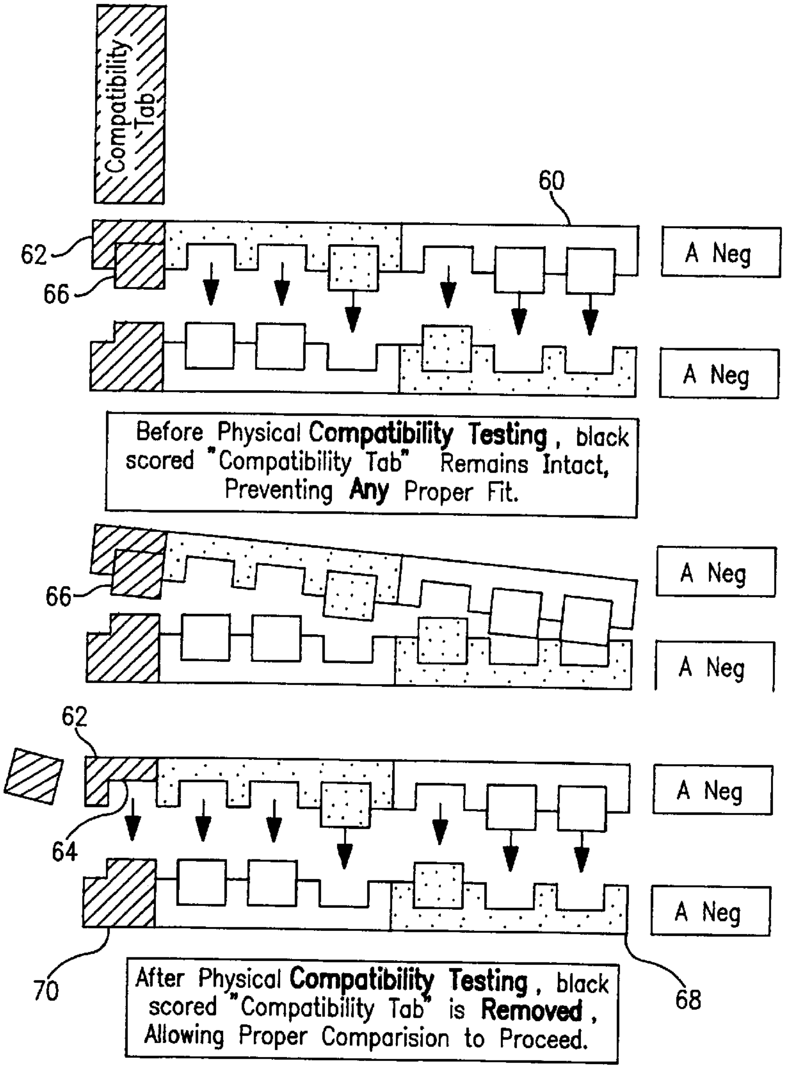
FIG. 12 is an illustration of an extension of the principle of the model embodied in a "compatibility tab," which corresponds to the physical (as opposed to theoretical) compatibility of actual samples of blood when mixed together.

Referring to FIG. 12, a blood product housing 60 is characterized by a compatibility block 62 having a recess 64. A compatibility tab 66 covers the recess 64. A patient housing 68 has a mating compatibility tab 70.

There is a space designated on the tab 66 for "Physical Compatibility." When a sample of donor blood is physically mixed with a sample of patient's blood in a test tube in the blood bank, its physical (as opposed to theoretical) compatibility is determined. The tab 66 is broken off only after compatibility testing is completed, if and only physical compatibility exists. To prevent the administration of compatibility-untested blood, the presence of that tag would prevent the proper fit of any combination of donor and recipient blood housings.

Figure 13:
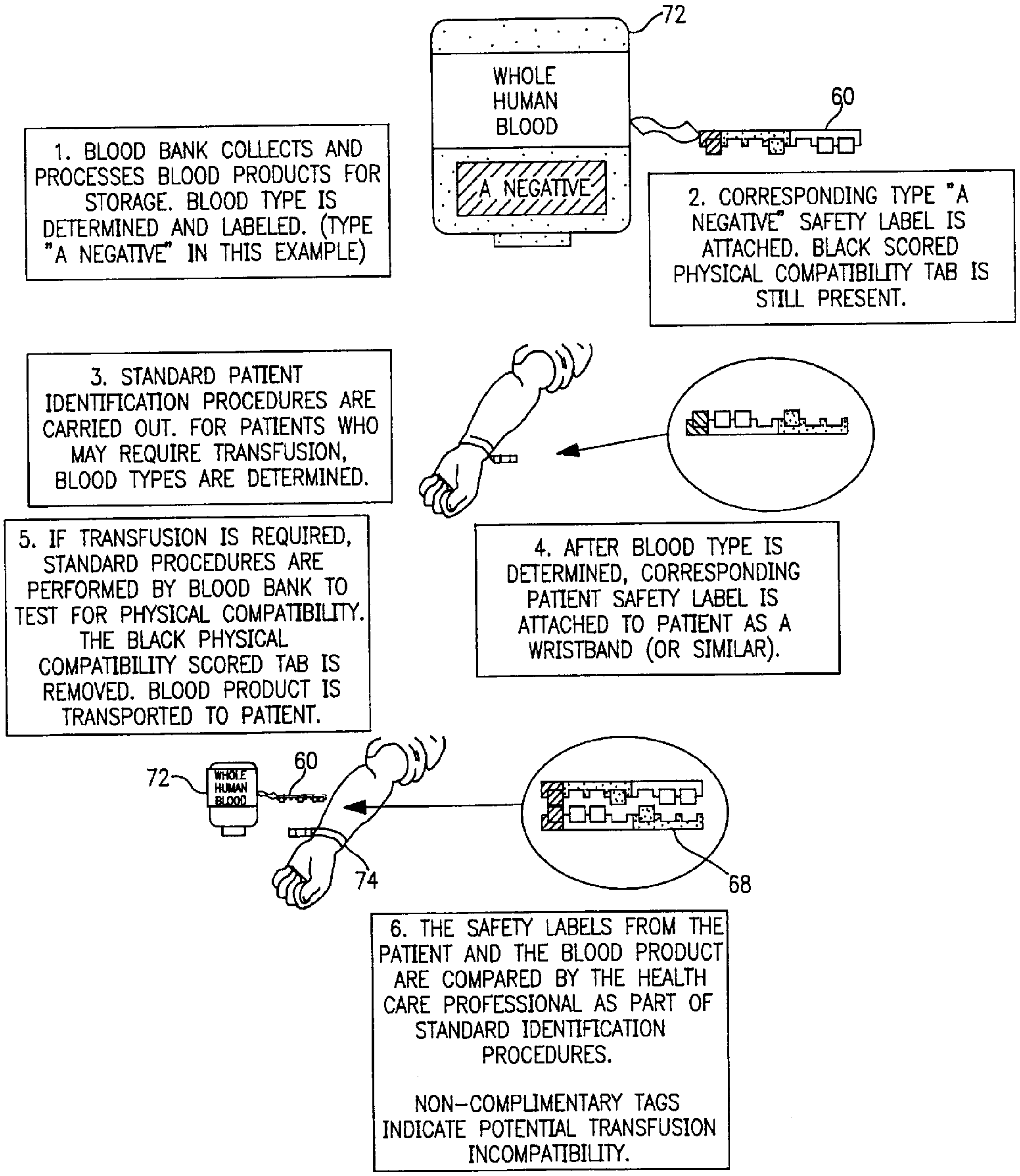
FIG. 13 is a procedural flow diagram implementing the invention of FIG. 12.

FIG. 13 illustrates a procedure of the invention using the embodiment of FIG. 12. Blood product 72 is attached in any suitable manner to the product housing 60. The patient housing 68 is attached to a patient bracelet 74.

Similarly, additional spaces or place holders for blocks/recesses could be added to the safety tags to represent other compatibility tests, such as the presence of minor (not major as A, B, and RH) antigens antibodies.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention, what I now claim is:

1. A blood product identification system which comprises:

a blood product housing having a face and at least one three-dimensional blood product indicium formed in the face, the shape of the blood product indicium being one piece of a set of two geometrically complementary pieces, the blood product indicium corresponding to the theoretical compatibility characteristics of a blood product;

a patient housing having a face and at least one three-dimensional patient indicium formed in the face, the shape of the patient indicium being the second piece of the set, the patient indicium corresponding to the theoretical compatibility characteristics of a patient's blood whereby when the patient housing is engaged in a face-to-face relationship with the blood product housing, if the blood product indicium and the patient indicium mate and seat then the blood product housing and patient housing will seat indicating that the characteristics of the blood product is of a type which is compatible with the characteristics of the patient's blood and if the blood product indicium and the patient indicium do not mate and seat then the blood product housing and patient housing will not seat indicating that the characteristics of the blood product is of a type that is not compatible with the characteristics of the patient's blood; and means for preventing the mating and seating of the blood product indicium with the patient indicium when the characteristics of the blood product is of a type that is theoretically compatible with the characteristics of the patient's blood but physical compatibility has not yet been determined, the means for preventing being distinct from the blood product and patient indicia and comprises a cavity on one of the housings, a mating protuberance on the other housing and a removable tab positioned to prevent the cavity and the protuberance from mating.

2. The system of claim 1 wherein the theoretical compatibility characteristics of the blood product and the patient's blood comprise antigen/antibody characteristics.

3. The system of claim 2 wherein the blood product indicium and patient indicium comprise recesses and projections.

4. The system of claim 3 wherein the recesses and projections are block-shaped.

5. The system of claim 3 wherein the blood product indicium and patient indicium correspond to the major antigens A, B, RH and the major antibodies anti-A, anti-B and anti-RH.

6. The system of claims 1, 2, 3 or 4 wherein the blood product indicium correspond to blood products selected from the group consisting of plasma/RBCs, RBCs, fresh frozen plasma, cyroprecipitate, platelets and packed RBCs.

7. The system of claims 1, 2, 3 or 4 wherein the patient indicium correspond to major antigen/antibodies selected from the group consisting of antigen-A, B, or RH, and anti-A, anti-B and anti-RH.

8. The system of claim 1 wherein the removable tab seals the cavity.

* * * * *